United States Patent
Roberts et al.

(10) Patent No.: US 7,352,971 B2
(45) Date of Patent: Apr. 1, 2008

(54) BROADBAND CONTROL OF POLARIZATION MODE DISPERSION

(75) Inventors: Kim B. Roberts, Nepean (CA);
Richard D. Habel, Ottawa (CA);
Maurice S. O'Sullivan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 540 days.

(21) Appl. No.: 10/209,904

(22) Filed: Aug. 2, 2002

(65) Prior Publication Data

US 2004/0208618 A1    Oct. 21, 2004

(51) Int. Cl.
*H04B 10/12* (2006.01)

(52) U.S. Cl. ............ 398/147; 398/158; 398/148; 398/149; 398/161; 398/152; 398/81; 398/65; 398/79; 398/159; 385/11; 356/73.1

(58) Field of Classification Search ........... 398/147, 398/148, 152, 158, 149, 159, 161, 81, 65, 398/79; 385/11; 356/73.1
See application file for complete search history.

(56) References Cited

U.S. PATENT DOCUMENTS

| | | | | |
|---|---|---|---|---|
| 5,473,457 | A | 12/1995 | Ono | 359/161 |
| 5,949,560 | A | 9/1999 | Roberts et al. | 359/110 |
| 6,104,515 | A | 8/2000 | Cao | 359/161 |
| 6,130,766 | A | 10/2000 | Cao | 359/161 |
| 6,240,748 | B1 | 6/2001 | Henderson et al. | 65/402 |
| 6,603,890 | B2 * | 8/2003 | Khosravani et al. | 385/11 |
| 6,801,721 | B1 * | 10/2004 | Madsen | 398/147 |
| 6,907,199 | B2 * | 6/2005 | Koch et al. | 398/81 |
| 2004/0208618 | A1 * | 10/2004 | Roberts et al. | 398/158 |

FOREIGN PATENT DOCUMENTS

WO    WO 01/86840    5/2001

OTHER PUBLICATIONS

"Component for Second-Order Compensation of Polarization-Mode Dispersion" Jul. 9, 1997, Jörn Patscher and Ralf Eckhardt.
"Long-Term Measurement of PMD and Polarization Drift in Installed Fibers" Magnus Karlsson, Jonas Brentel, and Peter A. Andrekson, Member, IEEE Journal of Lightwave Technology, vol. 18, No. 7, Jul. 2000, p. 941.

(Continued)

*Primary Examiner*—Hanh Phan
(74) *Attorney, Agent, or Firm*—Kent Daniels Ogilvy Renault, LLP

(57) ABSTRACT

A method and system is provided for compensating polarization mode dispersion (PMD) in an optical communications system includes a controller designed to control a broadband PMD compensator to differentially delay light at each one of a plurality of selected wavelengths. At least one of the selected wavelengths lies between an adjacent pair of channel wavelengths of the optical communications system. A performance parameter value indicative of PMD is measured at each channel wavelength of the optical communications system. An estimated performance parameter value is then calculated at each selected wavelength, and an error function calculated as a function of wavelength based on the estimated performance parameter values. The broadband PMD compensator is then controlled to minimize the value of the error function.

43 Claims, 8 Drawing Sheets

OTHER PUBLICATIONS

"Temporal Dynamics of Error-Rate Degradation Induced by Polarisation Mode Dispersion Fluctuation of a Field Fiber Link", 1997 Henning Bülow and Gustave Veith Alcatel Telecom Research Division, Alcatel SEL AG, Dept. ZFZ/NO—D-70430 Stuttgart, Germany.

"Polarization eigenmodes of a QHQ retarder—some new features" Rajendra Bhandari, Gordon D. Love Optics Communications 110 (1994) 479-484.

"Optical properties of a QHQ ferroelectric liquid crystal phase modulator" Gordon D. Love, Rajendra Bhandari Optics Communications 110 (1994) 475-478.

"Adaptive Optical Components Using Liquid Crystal Devices" Gordon D. Love Journal of the Communications Research Laboratory, Nov. 1999, vol. 46 No. 3, pp. 427-430.

* cited by examiner

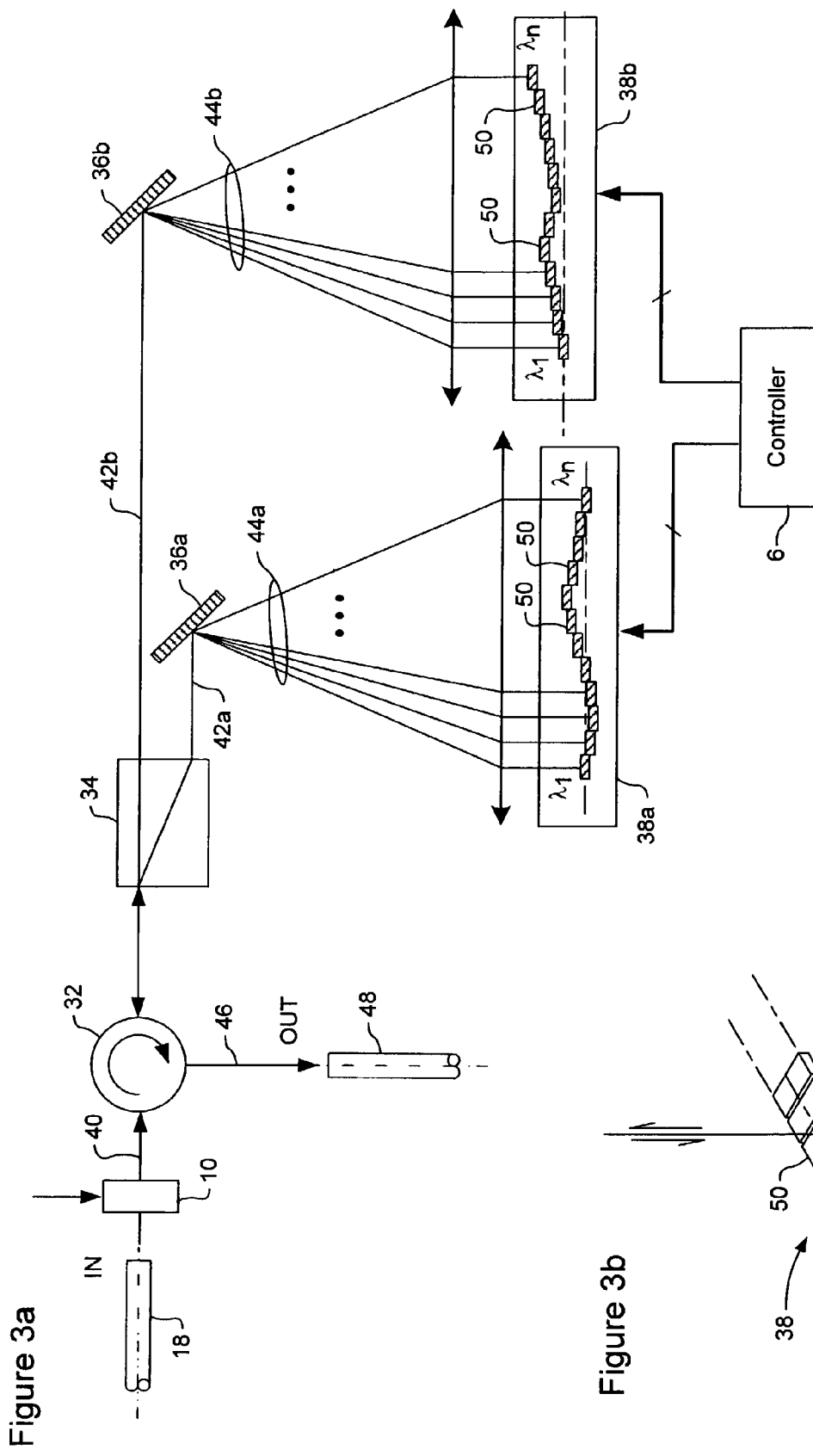

BROADBAND CONTROL OF POLARIZATION MODE DISPERSION

CROSS-REFERENCE TO RELATED APPLICATIONS

This is the first application filed for the present invention.

MICROFICHE APPENDIX

Not Applicable.

TECHNICAL FIELD

The present invention relates to optical transmission systems, and in particular to broadband control of polarization mode dispersion in an optical transmission system.

BACKGROUND OF THE INVENTION

The presence of polarization mode dispersion (PMD) can be a limiting factor in the design of optical transmission systems, particularly those providing long haul transmission of signal data streams of 10 Gb/sec or more over single mode fibers of the order of 100 kilometers in length. Although such fibers are nominally "single mode", propagation is generally characterized by two orthogonally polarized $HE_{11}$ modes for which slightly different group velocities exist in the presence of birefringence. Accordingly, for an arbitrary polarization of an optical signal at the input end of the fibre, the optical signal at the output end of the fibre will consist of both polarization modes separated by a certain amount of group delay. Cross-coupling of energy between the polarization modes, in the presence of this differential group delay (DGD), causes waveform distortion and consequent degradation of optical signal quality.

Optical transmission systems using data transmission rates of up to about 10 Gb/s are normally able to tolerate polarization mode dispersion on the order of 0.2 pico seconds per $\sqrt{km}$. Future optical transmission systems are expected to achieve data transmission rates of 40 Gb/s (or more), and thus are more likely to be limited by the effects of polarization mode dispersion. The effects of PMD in a high bandwidth optical link is discussed in "*Temporal Dynamics of Error-Rate Degradation Induced by Polarization Mode Dispersion Fluctuation of a Field Fiber Link*", Henning Bulow et al., Proceedings of the $23^{rd}$ European Conference on Optical Communications, IOOC-ECOC '97, Edinburgh, UK, Sep. 22-25, 1997. The impact of PMD in high bandwidth networks is expected to be particularly severe in systems which incorporate cross connected networks of fibers, in which an optical signal can follow any one of a number of possible routes utilizing different fibers (within the same or different cable), each with individual properties.

The amount of polarization mode dispersion varies from fiber to fiber, being dependent upon the amount of intrinsic birefringence associated with core asymmetry or frozen-in stress; extrinsic birefringence associated, for example, with cable induced stress, fiber bends or twists; and polarization coupling between optical elements within a link. As a result of these factors, PMD tends to be a statistical vector quantity which varies with both wavelength and time. For a detailed description of PMD, see "*Long-Term Measurement of PMD and Polarization Drift in Installed Fibers*", Magnus Karlsson et al., Journal of Lightwave Technology, Vol. 18, No. 7, (July, 2000). Various methods are known for measuring PMD in an optical transmission system, such as, for example, as disclosed in U.S. Pat. No. 5,949,560 (Roberts et al.).

In the prior art, there are three general categories of techniques used for PMD compensation, namely: all-optical, all electrical and hybrid. Both the electrical and hybrid PMD compensation methods involve the optical-electrical conversion of the optical signal traffic, and thus suffer increasing performance degradation as data bit-rates exceed about 10 Gb/s. For this reason, all-optical PMD compensation, in which the optical signal traffic remains in the optical domain, is the preferred choice for high bandwidth optical communications.

U.S. Pat. No. 6,240,748 (Henderson et al.) entitled "Frequency and Amplitude Modulated Spins for PMD Reduction" teaches reduction of PMD in a single mode fiber by spinning the fiber during the drawing process in accordance with a spin function having sufficient harmonic content to achieve low levels of PDM. This approach attempts to manipulate the intrinsic birefringence of the fiber to reduce the overall differential group delay, and thus PMD, experienced by light propagating through the fiber. However, this technique is inherently is incapable of addressing the effects of extrinsic birefringence.

U.S. Pat. No. 5,473,457 (Ono), entitled "Method and Apparatus for Compensating Dispersion of Polarization" teaches an all-optical PMD compensation system in which an optical signal received through an optical fibre is passed through a (high birefringence) polarization maintaining fibre. A polarization controller arranged between the optical fibre and the polarization maintaining fibre is used to rotate the PSP of the received optical signal, so that the polarization maintaining fiber imposes a PMD that is equal and opposite to that of the optical fiber. However, the success of this technique relies of the assumption that the optical fibre has a known PMD which remains constant. As pointed out above, PMD is typically time and wavelength-dependent, so the method of U.S. Pat. No. 5,473,457 (Ono) can, at best, compensate for the mean PMD of the optical fibre.

In the article entitled "*Component for Second-Order Compensation of Polarization Mode Dispersion*" by J Patscher and R Eckhardt (July 1997), a cascade of polarization controllers and short polarization maintaining fibres are used to compensate the PMD of a long single-mode fibre. This arrangement enables compensation of a greater range of PMD than that of the system of Ono, but otherwise suffers from many of the same disadvantages.

International Patent Publication No. WO/01/86840 (Bandemer et al.) published on Nov. 15, 2001 teaches an all-optical PMD compensation system in which a cascade of polarization controllers and short birefringent elements are used to compensate the PMD of a long single-mode fibre. An emulator is used to analyze the optical signal received through the optical fiber, and model the PMD of the optical fibre as precisely as possible. PMD model is then used to control the cascade to produce an equal and opposite PMD. This arrangement enables compensation of a greater range of PMD than that of the systems of Ono and Patscher et al. The emulator also provides real-time modeling of PMD, and thus addresses the issue of time-variance of PMD.

U.S. Pat. No. 6,104,515 (Cao), entitled "Method And Apparatus For Providing High-Order Polarization Mode Dispersion Compensation Using Temporal Imaging" teaches an all-optical PMD compensation system in which an optical phase modulator is controlled by a sinusoidal clock signal that is frequency-locked with the data signal, and phase-delayed by 90° relative to the data signal. As a result, for each bit passing though the optical phase modulator, a leading edge of the bit is retarded, and the trailing edge of bit advanced. Since this phase modulation effect is substantially independent of polarization mode, the net effect is that the fast polarization mode is retarded and the slow polarization mode advanced, thereby correcting DGD. This arrangement suffers the disadvantage that it relies on a precise phase relationship between the data signal and the sinusoidal clock signal controlling the phase modulator. Such precision can only be attained when there is only one data signal within the fibre. Accordingly, the system of U.S. Pat. No. 6,104,515 (Cao) must necessarily be duplicated for each channel within a WDM optical transmission system. This greatly increases costs, and introduces "dead bands" between channels, within which no PMD compensation is possible.

U.S. Pat. No. 6,130,766 (Cao), entitled "Polarization Mode Dispersion Compensation Via An Automatic Tracking Of A Principle State Of Polarization" teaches an all-optical PMD compensation system in which the polarization modes of a received optical signal are rotated to align with a polarization beam splitter. As a result, one of the polarization modes (ideally the polarization mode having the highest optical power) passes through the beam splitter and continues to the system output via an optical amplifier. The other polarization mode is used by the control unit. Rather than compensate PMD, this system eliminates it by physically removing one of the polarization modes entirely. This arrangement suffers the obvious disadvantage that up to half of the total optical power of the received optical signal is lost, if the received optical signal is unpolarized. If the received optical signal is polarized, then the entire optical signal can be lost, depending on whether or not the polarization direction of the received optical signal is corresponds with the mode used by the control unit.

Each of the above-described references suffer the further disadvantage that PMD is typically non-linear across the range of wavelengths used in WDM optical transmission systems. The system of U.S. Pat. No. 6,104,515 (Cao) necessarily requires per/channel demuxing of the optical signal within a fibre, because only one optical signal can compensated. In principle, the systems described in each of the other references can provide broadband PMD control. However, in this case, each wavelength will be subject to the same optical processing, resulting approximately constant PMD compensation across the wavelengths of interest. Where PMD is varies, per-channel demuxing of the optical signal is necessary, so that each channel can be treated independently. This increases the cost of the system, and introduces dead-bands between the channels, in which no PMD compensation is possible. Furthermore, per-channel PMD compensation necessarily ties the system to the channel plan (i.e. number and wavelength separation between channels) of the optical transmission system. Consequently, any changes in the channel plan necessitates expensive modification (or outright replacement) of installed PMD compensation equipment.

Accordingly, a technique for implementing broadband control of polarization mode dispersion remains highly desirable.

SUMMARY OF THE INVENTION

An object of the present invention is to provide a method and system for dynamic broadband compensation of polarization mode dispersion.

Accordingly, an aspect of the present invention provides a method of compensating polarization mode dispersion (PMD) in an optical communications system having a broadband PMD compensator adapted to impose a wavelength-dependent phase delay of optical signal traffic. According to the present invention, the broadband PMD compensator is controlled to differentially control phase delay at each one of a plurality of selected wavelengths. At least one of the selected wavelengths lies between an adjacent pair of channel wavelengths of the optical communications system.

A further aspect of the present invention provides a system for compensating polarization mode dispersion (PMD) in an optical communications system having a broadband PMD compensator adapted to impose a wavelength-dependent phase delay of optical signal traffic. The system comprises a controller designed to control the broadband PMD compensator to differentially delay light at each one of a plurality of selected wavelengths. At least one of the selected wavelengths lies between an adjacent pair of channel wavelengths of the optical communications system.

In some embodiments, a respective performance parameter value indicative of PMD is measured at each channel wavelength of the optical communications system. An estimated performance parameter value is then calculated at each selected wavelength, and an error function calculated as a function of wavelength based on the estimated performance parameter values. The broadband PMD compensator can then be controlled to minimize the value of the error function.

BRIEF DESCRIPTION OF THE DRAWINGS

Further features and advantages of the present invention will become apparent from the following detailed description, taken in combination with the appended drawings, in which:

FIGS. 3a and 3b illustrates principle elements and operation of a full-vector broadband PMD compensator unit usable in the embodiment of FIGS. 1 and 2;

It will be noted that throughout the appended drawings, like features are identified by like reference numerals.

DETAILED DESCRIPTION OF THE PREFERRED EMBODIMENT

Figure 1:
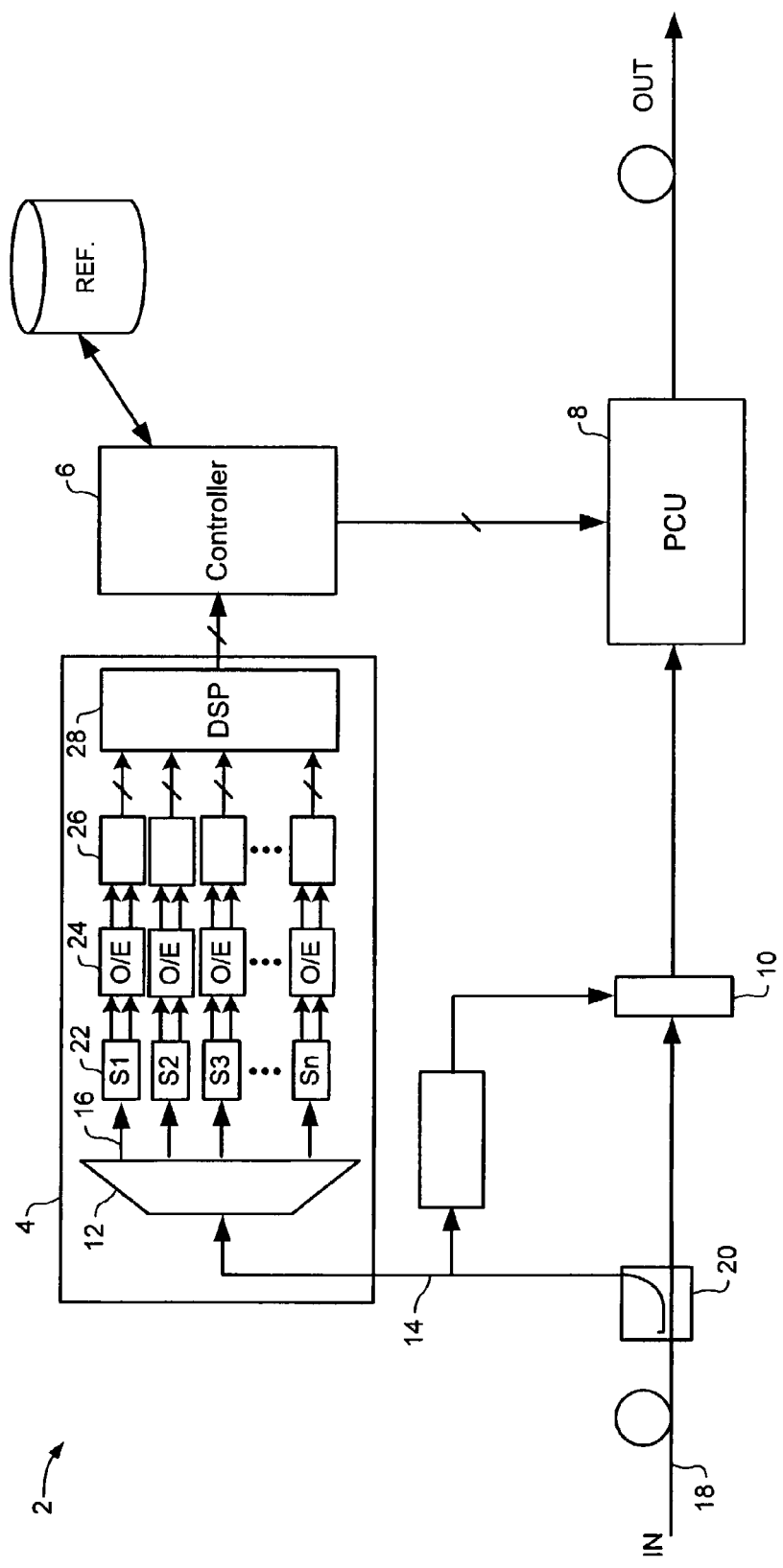
FIG. 1 is a block diagram schematically illustrating principle elements in a dynamic PMD compensation system in accordance with an embodiment of the present invention.

The present invention provides a system for broadband dynamic compensation of PMD within a Wavelength Division Multiplexed (WDM) optical communications system. FIG. 1 is a block diagram schematically illustrating principle elements of a PMD compensation system in accordance with the present invention.

As shown in FIG. 1, the PMD compensation system 2 generally comprises a monitor 4; a controller 6; and a broadband PMD compensator unit (PCU) 8. If desired, a polarization rotator 10 may be used to convert arbitrary polarization of inbound optical signal traffic into an aligned polarization state, in a manner known in the art.

The monitor 4 is designed to measure a selected performance parameter across a wavelength band that encompasses the optical signal traffic within the communications system. Any performance parameter that is indicative of polarization mode dispersion may be used for this purpose. Preferably, a performance parameter that is directly indicative of PMD is used. An exemplary performance parameter of this type includes differential group delay (DGD) of each channel signal. Alternatively, indirect performance parameters, such as electrical signal-to-noise (S/N) ratio detected by a downstream receiver, and bit error rate (BER), may be used. In the embodiment of FIG. 1, the monitor 4 is provided as a "full vector" monitor, which outputs an array of DGD values across a range of wavelengths. Thus, the monitor 4 is provided with an optical demultiplexer 12 for demultiplexing a composite light beam 14 to separate each of the channel signals 16. The composite light beam 14 can be obtained by tapping the optical signal traffic in a fiber 18 of the communications system using, for example, a convention 5% optical tap 20. The respective $HE_{11}$ modes of each channel 16 are separated using, for example, a conventional polarization beam splitter 22 and detected by an optical-to-electrical (O/E) converter 24. A detector 26 can then be used to detect PMD using, for example the methods described in U.S. Pat. No. 5,949,560 (Roberts et al.). If desired, a Digital Signal Processor (DSP) 28 can be provided to analyze the detected PMD values to output the array in a desired format. As will be appreciated, the values of the array will (for the full vector monitor 4 of FIG. 1) be directly indicative of PMD across the range of wavelengths of the optical signal traffic within the fiber 18. The monitor 4 can be provided as a discrete element, or integrated within a larger performance monitoring system, as desired.

Alternatively, the performance parameter may provide an indirect indication of PMD. For example, most conventional performance monitoring systems calculate a bit error rate for each channel. Since the bit error rate is a function of the electrical S/N ratio, which, in turn, is related to PMD, the bit error rate for each channel may be used as an indicator of PMD. Thus it will be appreciated that the present invention is in no way intended to be limited to the embodiment of FIG. 1.

The controller 6 uses the performance parameter measured by the monitor 4 to calculate an error function indicative of a difference between the measured performance parameter and a predetermined reference that will normally represent a desired (or optimum) performance of the optical communications system. The controller 6 then uses the error function to adjust control settings of the PMD compensator unit (PCU) 8 in order to control the PCU 8 to impose a differential phase delay that minimizes the error function.

The reference used for calculating the error function may be substantially fixed. For example, in the embodiment of FIG. 1, the measured performance parameter consists of an array of measured per channel differential group delay (DGD) values. In this case, a suitable fixed reference may be defined at a time of installation of the PMD compensation system 2. An exemplary fixed reference that may conveniently be used includes a "zero DGD" reference, which is defined such that the error function will represent the phase difference between the two polarization directions. In this case, the controller 6 can readily use the error function to control the PCU 8 to minimize this difference (and thus the DGD). Alternatively, a dynamic reference may be used. For example, a second performance parameter array can be generated by a second monitor, as will be described in greater detail below. In this case, the second performance parameter array can be used as a dynamic reference, so that the error function will represent the difference between the two measured performance parameter arrays.

As may be appreciated, various methods may be used to control the PCU 8 to provide optimized compensation of PMD. In embodiments in which the measured performance parameter is directly indicative of PMD (as in the embodiment of FIG. 1, for example) a simple first-order control loop can be used to calculate an error function and control the PCU 8 to impose equal and opposite PMD. In cases where PMD is "indirectly" measured (e.g., using bit error rate as an indicator of PMD), various known iterative techniques can be utilized to find PCU control settings that optimize the performance of the communications system.

One or more broadband PMD compensation units 8 may be provided along a link between nodes of an optical communications system, as desired. Typically, each PCU 8 will be associated with a PMD measurement point (i.e., a tap 20 and, usually, a monitor 4). However, in some instances (particularly those in which indirect methods are used to indicate PMD), the measurement point (and monitor) may be remote from the PCU 8. Maximum performance (at least in terms of rapid response) can be obtained by providing a local controller 6 for each PCU 8. However, where response delays can be tolerated, a centralized controller 6 can be used to control the operation of one or more PCU's 8.

Figure 2C:
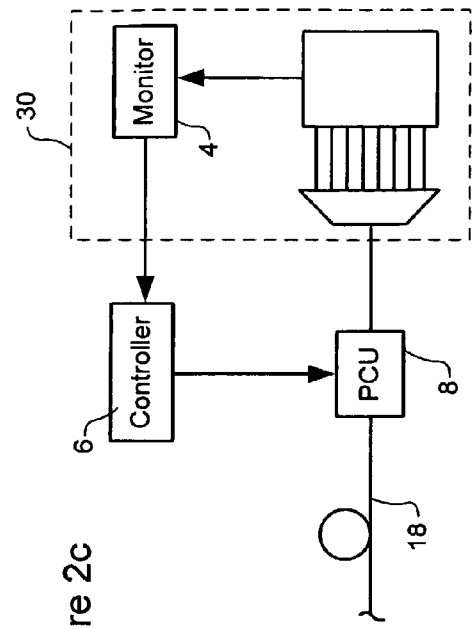
FIGS. 2a-c illustrate respective alternative implementations of the dynamic PMD compensation system in accordance with the present invention, deployed in an optical communications system.
Figure 2A:
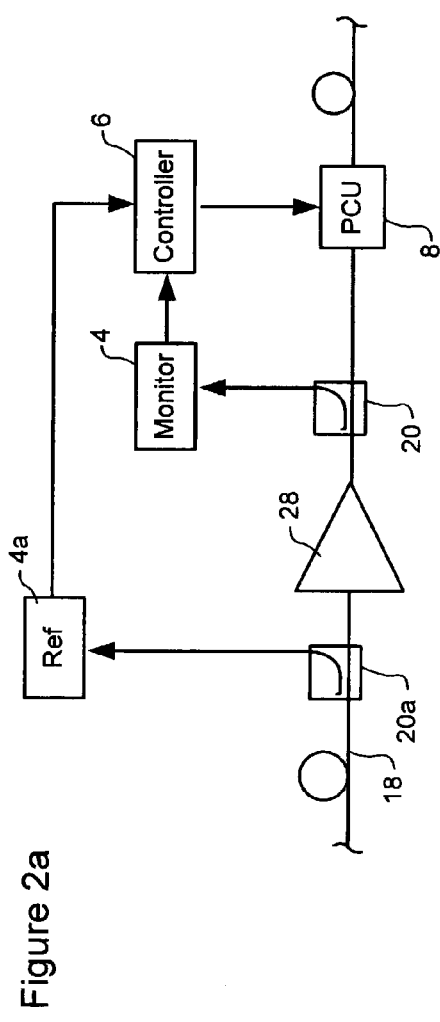
Figure 2B:
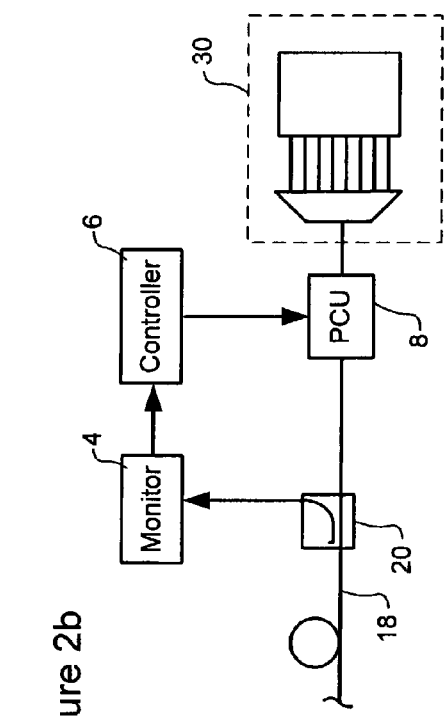

FIGS. 2a-c illustrate respective exemplary implementations of the PMD compensation system 2 of the present invention. FIG. 2a depicts an embodiment of the PMD compensation system 2 implemented for the minimization of local PMD of an optical element 28 such as, for example, an optical subnetwork. In this case, the goal is to minimize the PMD of the element 28 without regard to the PMD introduced by any upstream components. This implementation is particularly suited to situations in which the PMD of the element 28 changes more slowly, and within a narrower range than PMD within the larger network, thereby making PMD of the element 28 easier to track and compensate.

As shown in FIG. 2a, PMD introduced by the element 28 can be compensated by monitoring the same performance parameter both immediately upstream and downstream of the element 28. The monitored upstream parameter value(s) can be used as the reference, and the error function found by subtracting the downstream parameter value(s) from this reference. The controller 6 can then control the PCU 8 to minimize the error function. A simple first order control loop can be used to dynamically track and compensate the PMD of the element 28 in this manner. Because the PMD of discrete optical components, such as amplifiers, tends to vary slowly with time, a high-speed response is not necessary. Thus the monitors 4 and controller 6 can be remote from the PCU 8, if desired. In this case, however, no attempt would normally be made to compensate for the PMD present at the input to the element 28, as that PMD will change more rapidly than the relatively slow control loop can track. Improperly tracked PMD compensation merely increases the amount of transient PMD.

FIGS. 2b and 2c illustrate alternative implementations of the broadband PMD compensation system 2, for compensating (possibly rapidly changing) PMD upstream of a discrete network element. In the embodiment of FIG. 2b, a monitor 4 is associated with the PCU 8, and is closely coupled to a local controller 6. In principle, such an embodiment can be provided at any desired location along a network link, to provide high-speed dynamic PMD compensation. The embodiment of FIG. 2c utilizes the optical signal processing and performance monitoring functionality of a network node 30 to monitor PMD. Such an embodiment will typically be appropriate in cases where the node 30 is capable of measuring PMD across the wavelength band of interest, or alternatively, where an indirect indicator of PMD (e.g., per-channel bit error rate) is used as the basis of PMD compensation.

If desired, local PMD compensation at each of several points along a network link may be controlled so as to produce an optimum distribution of PMD compensation along the link. For example, as described in co-owned and co-pending U.S. patent application Ser. No. 09/956,557 filed on Sep. 20, 2001, the contents of which is incorporated herein by reference, the bit error rate (BER), or, if desired, S/N ratio, can be measured on a per-channel basis at a receiving end of an optical link. The control settings used for controlling each discrete optical device along that link can be individually perturbed, and the perturbations correlated with changes in the measured BER. By iteratively perturbing control settings and monitoring corresponding changes in the BER, a "sensitivity matrix" defining the relationship between the BER at the receiving end of the link and the control settings of each optical device along the link can be determined. This relationship can be used (possibly in conjunction with a cost function) to calculate control setting values that will most nearly optimize the performance of the optical link as a whole.

This "global optical control" technique can be directly employed to implement centralized control of multiple PCUs 8 distributed along an optical link. In this case, the S/N ratio and/or the PMD (measured at the receiving end of the link) may equally be used in place of the BER, as the basis for determining optimal control parameter values. If desired, S/N ratios can be measured at multiple points along an optical link, and used as the basis of link performance optimization.

Given the speed of light delays in long systems and the time delays associated with measurements and device responses, the "global optical control" technique of optical performance optimization will be best suited to slow optimization for the compensation of local PMD. Optimizing for the best steady state receiver signal quality will also minimize the size of PMD transients, as fast changes in the polarization coupling between amplifier nodes will not cause large transients if the PMD at those nodes has been substantially compensated. Where high-speed PMD compensation is required, PCUs 8 with local PMD monitoring and controllers 6, as shown in FIGS. 1 and 2a,b can be deployed at selected locations along the link.

As mentioned above, the nature and degree of PMD compensation achieved by the controller 6 and PCU 8 will be largely dependent on the operational characteristics of the PCU 8. For the purposes of the present disclosure, PMD compensation is described below for a full-vector PCU 8 capable of compensating arbitrary DGD across a wavelength range of interest.

FIGS. 3 through 6 schematically illustrate operation of a broadband dynamic PMD compensation system using a full vector PMD compensator unit (PCU) 8. As shown in FIG. 3a, an exemplary full vector PCU 8 generally comprises an optical circulator 32; a beam splitter/combiner 34; a diffraction element 36; and a phase delay assembly 38. The beam splitter 34, which may be provided as either a conventional polarization beam splitter or a birefringent crystal, operates to divide an inbound light beam 40 received through optical fiber 18 into a pair of beams 42, based on the polarization direction. By suitably aligning the polarization directions of the inbound light beam 40 with the principal axes of the beam splitter 34 (e.g., using polarization rotator 10), it is possible to obtain spatial separation of orthogonal polarization modes across all channels of the communication system. Thus, in the example of FIG. 3a, a first light beam 42a emerging from the beam splitter 34 contains all of the vertical polarization modes of the inbound light beam 40, while the other beam 42b contains all of the horizontal polarization modes. Each beam 42 is made incident on a dispersive element 36 (such as, for example, a conventional diffraction grating, an optical spectrometer or an optical demultiplexer) in order to cause spatial separation of the wavelengths 44 of each beam 42. The separated wavelengths 44 of each mode 42 are then made incident on a respective phase delay assembly 38 which provides a selective, per wavelength phase delay of the incident light.

The embodiment of FIG. 3a is configured as a "double-pass" system, in which the separated wavelengths 44 of each polarization mode 42 propagate from the phase delay assembly 38 back along their inbound path toward the beam splitter 34, via the dispersive element 36. The dispersive element 36 deflects the spatially separated wavelengths 44 into a single collimated beam, which then retraces (or closely parallels) the path of the inbound light back to the beam splitter 34. Because the beam splitter 34 is a reciprocal device, the two outbound polarization modes 42 are recombined by the beam splitter 34 to form a composite outbound light beam 46 that is directed into the output fiber 48 by the circulator 32.

As mentioned previously, each phase delay assembly 38 is independently controlled to impose a wavelength-dependent phase delay to incident light. Various methods are known in the art for implementing a controllable phase delay. For example, the length of the optical path traversed by the light can be mechanically controlled, for example, by means of a movable mirror interposed in the propagation path. Wavelength-dependent phase delay can be obtained by providing each phase delay assembly 38 as an array of individually movable mirrors 50. With this arrangement, each mirror 50 operates to selectively delay incident light, independent of the operation of adjacent mirrors 50. This arrangement enables an arbitrary phase delay profile to be obtained across the full range of wavelengths of the inbound light beam 40, independent of the channel plan of the communications system.

Figure 4:
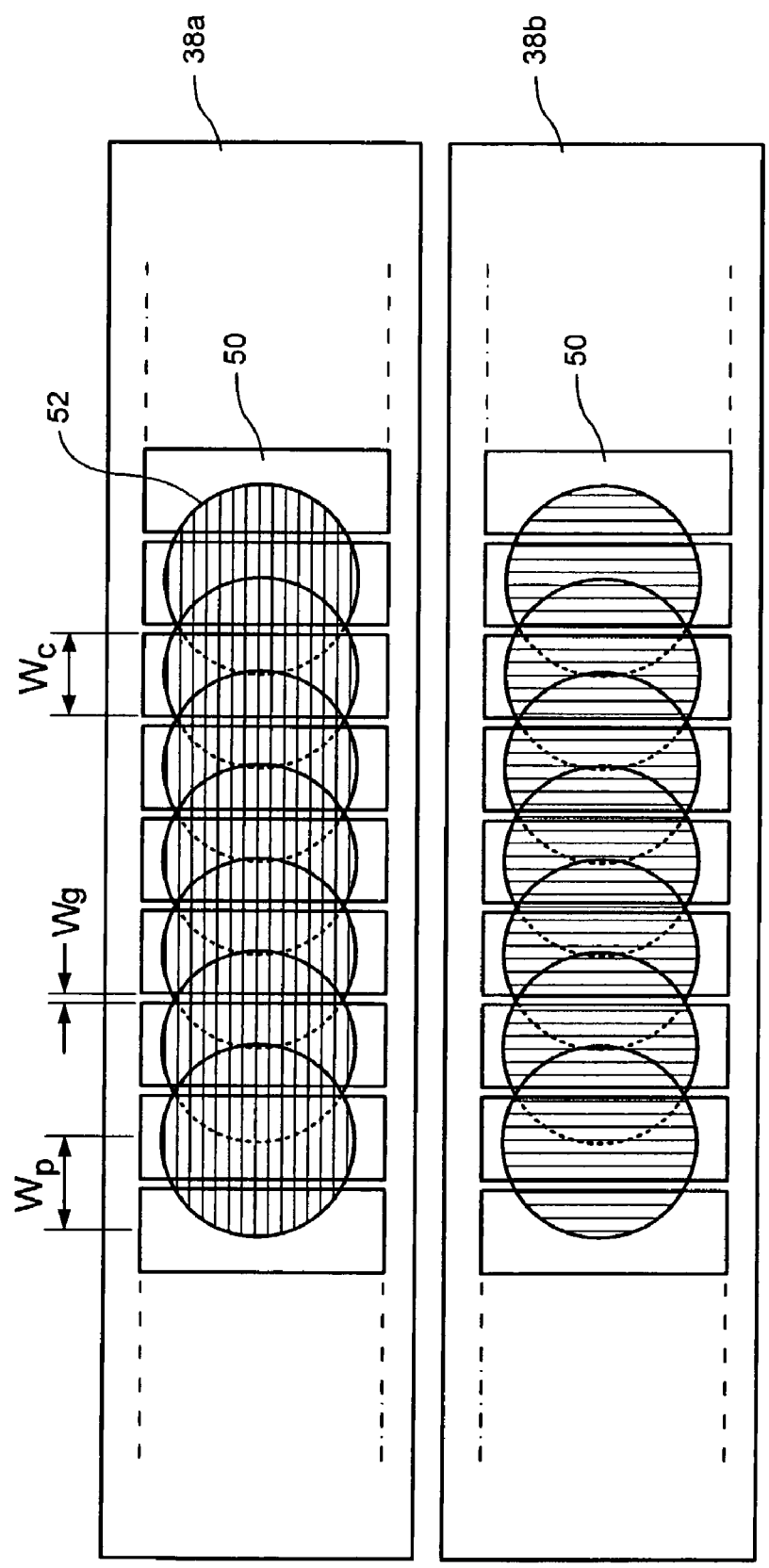
FIG. 4 illustrates principle elements of an exemplary phase delay assembly usable in the PMD compensator unit of FIG. 3.

As may be seen in FIG. 4, mechanical interference between adjacent mirrors 50 can be avoided by separating each mirror 50 by a gap having a width $W_g$. Optical distortion due to the gaps can be kept within acceptable limits by keeping the width $W_g$ of the gap less than about 10 percent of the width $W_c$ of each mirror 50. Together, $W_c$ and $W_g$ determine the resolution of the array, and thus the degree of accuracy with which DGD variations across the involved range of wavelengths can be compensated. Preferably, $W_c$ and $W_g$ will be made as small as practical, commensurate with the limitations that: $W_g$ should be held large enough to avoid mechanical interference; and increasing numbers of mirrors 50 inherently increases the size and complexity of the controller 6.

As may be appreciated, the dispersive element 36 and other optical elements (not shown) of the PCU 8 will cooperate to focus the optical energy of each wavelength within a Gaussian distribution on its associated phase delay assembly 38. For simplicity of description and illustration, it is convenient to describe this Gaussian distribution as a beam-spot 52 having a known (non-zero) diameter. Preferably, the pitch $W_p$ ($=W_c+W_g$) between adjacent mirrors 50 is smaller than the beam spot diameter, so that energy of each wavelength will fall incident on more than one mirror 50, as shown in FIG. 4. As a result, the amount of phase delay experienced by each wavelength will normally be a weighted average of the respective phase delays imposed by each involved mirror 50. This arrangement achieves a desired smooth variation of phase delay across the wavelength spectrum, avoiding the step-wise variation that would be obtained if each wavelength (or channel) were made incident on its own discrete mirror 50.

As shown in FIG. 3, per-wavelength phase delay control is obtained by adjusting the position of each mirror 50 to vary the length of the optical path traversed by each wavelength through the PCU 8. Increasing the optical path length yields a corresponding phase delay in the outbound light beam 46, while shortening the optical path length yields a corresponding phase advance. In order to facilitate PMD compensation, each mirror 50 of one assembly 38*a* is preferably matched with a corresponding mirror 50 in the other assembly 38*b* that receives the same channel wavelength. Thus PMD compensation can be accomplished by differentially controlling the position of corresponding mirrors 50 in each of the assemblies 38*a,b* so that, for each channel wavelength, the optical path traversed by the faster optical mode is lengthened, while the optical path traversed by the slower optical mode is shortened. For example, a differential group delay (DGD) of 4.5 picoseconds can be compensated by adjusting the respective optical path lengths so that the fast optical mode traverses a path that is approximately 1.3 mm longer than the optical path length traversed by the slow optical mode.

For the purpose of control, it is convenient to define a respective center wavelength for each mirror 50, which corresponds to the wavelength of light that is incident on the center portion of the mirror 50, as shown in FIG. 3*b*. This means that each mirror 50 will have a respective different center wavelength, and the set of center wavelengths will be substantially evenly distributed across the entire range of wavelengths of the inbound light beam 40. In order to facilitate PMD compensation, each mirror 50 of one assembly 38*a* is preferably matched with a corresponding mirror 50 in the other assembly 38*b* that has the same center wavelength. Thus PMD compensation can be accomplished by differentially controlling corresponding mirrors 50 in each of the arrays 38*a,b*. Alternatively, the mirrors 50 of one assembly 38 can be fixed, and the mirrors 50 of the other assembly 38 controlled to compensate PMD. This latter alternative simplifies control, and thus the complexity of the controller 6, but at the cost of a lower dynamic range of PMD compensation. It will be appreciated that the center wavelengths of the mirrors 50 may be substantially independent of the channel wavelengths of the optical communications system. If desired, there can be many more center wavelengths than channel wavelengths, and any given center wavelength may or may not correspond to a channel wavelength.

Figure 5:
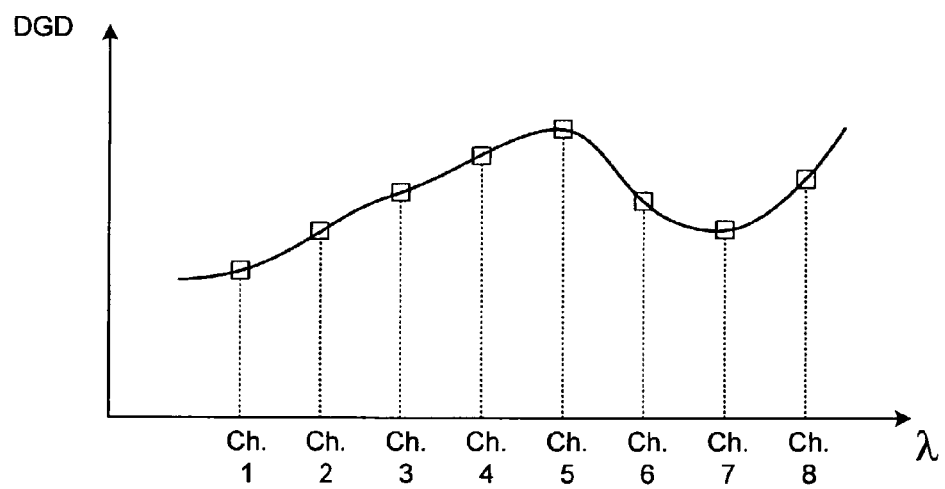
FIGS. 5 and 6 illustrate an exemplary PMD compensation process in accordance with an embodiment of the present invention.

As described above, the full vector monitor 4 of FIG. 1 operates to measure the DGD of each channel 16 of the optical signal traffic. In order to simplify illustration, the resulting array of measured DGD values can be plotted against wavelength, as shown in FIG. 5. A best fit curve can be mapped through the data points to enable estimation of DGD values at wavelengths lying between adjacent channels. Alternatively, linear interpolation may be used for this purpose. In either case, the error function values can be determined as the difference between the DGD profile and the reference, and plotted against wavelength, as shown in FIG. 6.

Figure 6:
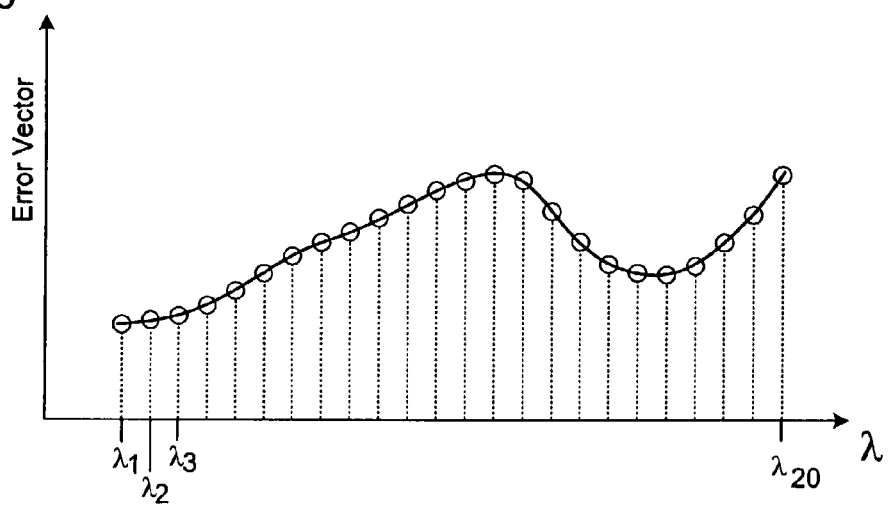

Using the error function profile shown in FIG. 6, the phase delay required to compensate PMD at each center wavelength can readily be determined. It is then a simple matter to differentially control corresponding mirrors 50 in each of the two phase control arrays 38 to provide an equal and opposite DGD for each center wavelength.

As will be appreciated, the amount of phase adjustment that can be accomplished using the phase control arrays 38 of FIGS. 3 and 4 will be entirely dependent on the range of movement of the mirrors 50. This, in turn, will be a function of the mechanical arrangements selected for supporting and positioning each mirror 50, as will be described in greater detail below.

Figure 7B:
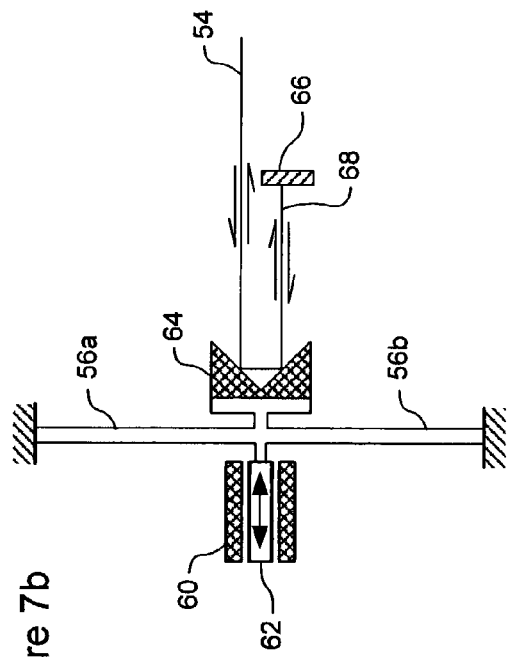
FIGS. 7a-e illustrate respective alternative mirror elements usable in the phase delay assembly of FIGS. 3 and 4.
Figure 7A:
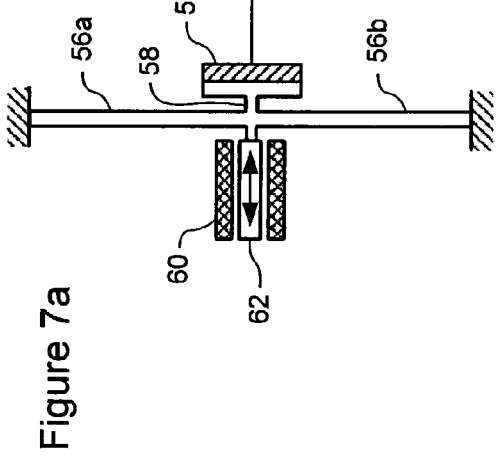
Figure 7C:
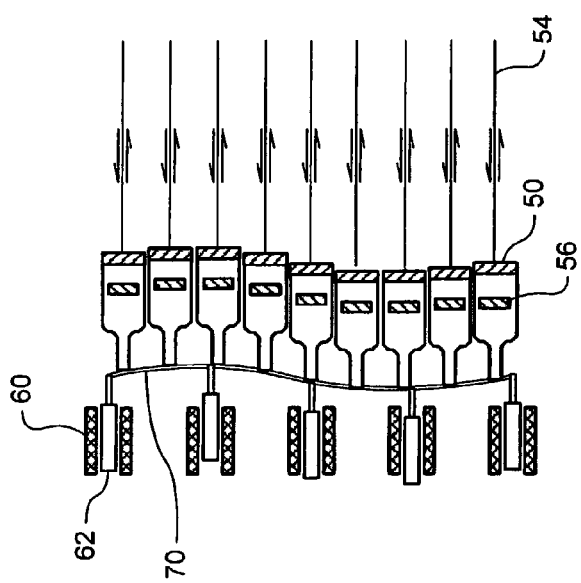

FIGS. 7*a-c* illustrate respective alternative mechanical arrangements for supporting each mirror 50 of a phase delay assembly 38. In the embodiment of FIG. 7*a*, a plane mirror 50 is positioned in the path 54 of inbound light, which is reflected back along its incident path. The plane mirror 50 is supported by a pair of resilient cantilever beams 56, which allow the mirror 50 to be displaced parallel to the path 54 of the incident light to thereby vary the optical path length. As may be appreciated, the change in the optical path length will be twice the mirror displacement. If desired, the mirror 50 can be supported by a short post 58 which prevents distortion of the mirror 50 as the cantilever beams 56 flex.

An advantage of the use of a pair of opposed cantilever beams 56, as shown in FIG. 7*a*, is that bending moments within each beam 56 cancel at the center of the structure (that is at the mounting point of the mirror 50), so that the mirror 50 remains perpendicular to the path 54 of the incident light, even as the beams 56 flex. As is well known in the art, various means may be used to displace the mirror 50, including, for example, electrostatic fields, magnetic fields, and piezo-electric actuators. In the illustrated embodiment, a solenoid 60 is magnetically coupled to a permanent magnet 62 affixed to a center portion of the cantilever beam structure. This arrangement allows a controllable magnetic force to be applied to the cantilever beam structure, that will vary in accordance with the electric current applied to the solenoid 60. As will be appreciated, the cantilever beams 56 cooperate to form a "spring-mount", allowing the plane mirror 50 to be displaced from a central rest position by a distance that is proportional to the magnitude of the magnetic force generated by the solenoid 60.

As may be appreciated, the amount of displacement of the mirror 50 that can be achieved will be limited by the dimensions (i.e., the stiffness) of the cantilever beam structure, and the maximum force that can be generated by the solenoid 60 (or any other actuator system that may be used). Both of these factors may be limited by constraints imposed by the desired size of the phase delay assembly 38 as a whole. As a result, it is possible that the maximum displacement of the mirror 50 will be insufficient to achieve a desired DGD compensation.

One method of addressing this concern is to increase the number of times that the light is reflected from the mirror 50. For example, in the embodiment of FIG. 7b the plane mirror of FIG. 7a is replaced by a pair of angled mirrors defining a retro-reflective mirror assembly 64 mounted on the cantilever beam structure. The retro-reflective mirror assembly 64 operates to reflect inbound light to a fixed plane mirror 66, which then reflects the light back along its inbound path 54, via the retro-reflective mirror 64. The optical path 68 between the retro-reflective mirror assembly 64 and the fixed plane mirror 66 is parallel to, and laterally offset from the path 54 of the inbound and outbound light, so that the fixed plane mirror 66 will not interfere with light approaching and departing the phase delay assembly 38. With this arrangement, the light encounters the retro-reflective mirror assembly 64 twice, so the change in the optical path length will be four times the displacement of the retro-reflective mirror assembly 64.

In either of the embodiments of FIGS. 7a and 7b, it is possible that, in order to generate the required forces, the solenoid 60 (or other actuator system) must be made too large to enable each mirror 50, 64 to be independently controlled. In this case, a flexible membrane or spline 70 can be used to couple each of the mirrors 50, 64 within the assembly 38, as may be seen in the top view of FIG. 7c. A relatively small number of solenoids 60 can then be coupled to the spline 70, and controlled to impose a desired bending profile. Each of the mirrors 50,64 of the assembly 38 will then be displaced to follow the contour of the spline 70, thereby providing a desired displacement to each of the mirrors 50,64.

Figure 7D:
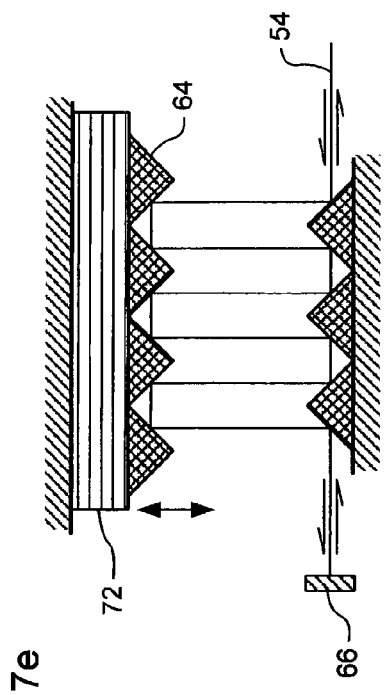

FIG. 7d shows a further alternative embodiment, which is similar to the embodiment of FIG. 7b, in that a retro-reflective mirror assembly 64 is used in conjunction with a fixed plane mirror 66. As in the embodiment of FIG. 7b, inbound light is reflected by the retro-reflective mirror assembly 64 to the fixed plane mirror 66, which then reflects the light back along its inbound path 54 (via the retro-reflective mirror assembly) so that the change in the optical path length will be four times the mirror displacement. However, the embodiment of FIG. 7d also exploits the fact that the optical paths 54 and 68 traversed by the inbound (and outbound) light remain parallel even as the angular orientation of the retro-reflective mirror assembly 64 changes. In this case, the retro-reflective mirror assembly 64 can be mounted on a single cantilever beam 56. Displacement of the retro-reflective mirror assembly 64 can then be controlled by suitable actuator mechanisms well known in the art, such as, for example, piezo-electric actuators (not shown) affixed to opposite sides of the cantilever 56. An advantage of this arrangement is that, because angular displacement of the retro-reflective mirror assembly 64 can be tolerated, a single cantilever beam support can be utilized, which reduces stiffness and enables the retro-reflective mirror assembly 64 to be displaced through a significantly greater range.

Figure 7E:
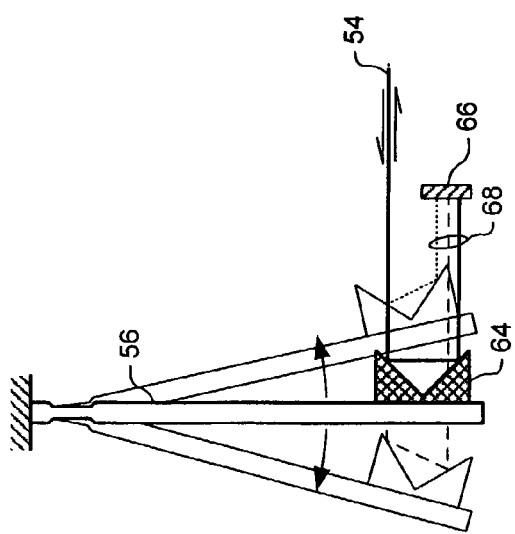

FIG. 7e shows a further alternative embodiment, in which a plurality of retro-reflective mirrors 64 are mounted on a piezo-electric stack 72. In this case, displacement of the retro-reflective mirrors 64 can be accomplished by varying the voltage applied across the piezo-electric stack 72. While absolute displacements provided by the piezo-electric stack 72 may be relatively small (e.g. on the order of 0.01 mm), multiple retro-reflective mirrors 64 may be combined to provide a desired change in the optical path length.

Figure 8:
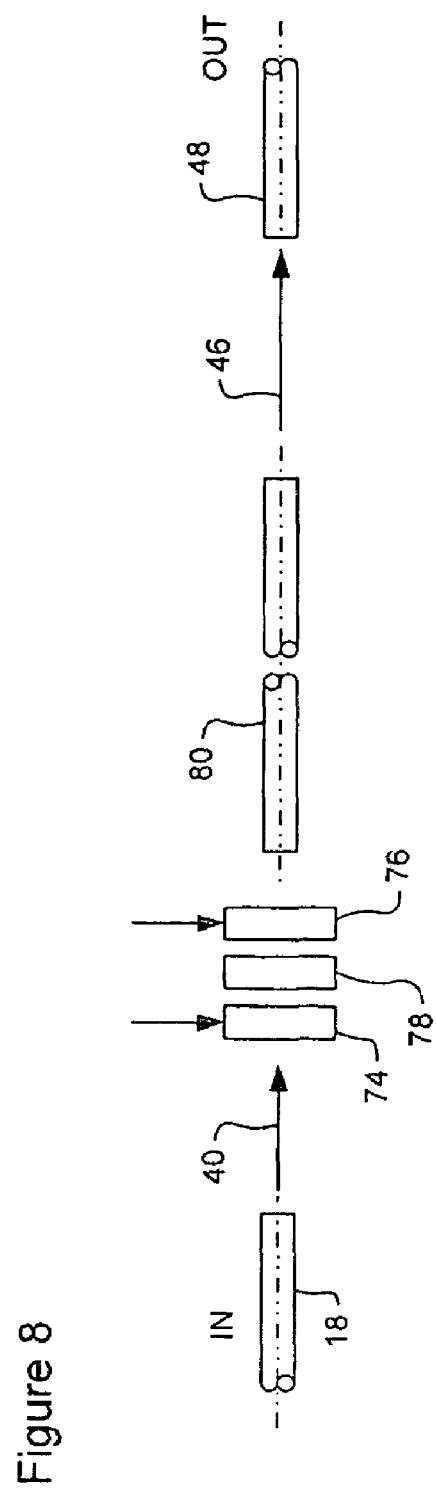
FIG. 8 illustrates principle elements of a linear broadband PMD compensator unit usable in the embodiment of FIGS. 1 and 2.

The broadband PMD compensation unit of FIGS. 3 through 7 is capable of providing full vector compensation of PMD across the full range of wavelengths of the inbound light beam 40. As may be appreciated, decreasing the size of each mirror 50 increases resolution and reduces step-wise changes in optical attenuation. However, the implementation and control of large phase delay assemblies 38 (i.e., with large numbers of small mirrors 50) tends to increase the cost and complexity of the polarization compensation system 2. In some cases, the PMD of discrete optical devices 28 (e.g., subnetworks) can be readily characterized, and is frequently substantially linear (at least within a reasonable approximation) across the range of wavelengths of interest. Where it is desired to provide compensation of PMD introduced by such a discrete optical component 28, a substantially simpler, linear broadband compensation unit 8 may be used. FIG. 8 schematically illustrates an exemplary linear broadband compensation unit 8, in which the inbound light beam 40 is processed to cause an angular separation of light. This angular separation can then be used to impose a desired wavelength and polarization-dependent phase delay of light coupled into the output fiber 48. This functionality will be described in greater detail below.

FIG. 8 shows principal elements of a linear BCU 8. As shown in FIG. 8, the linear BCU 8 comprises first and second controllable polarization rotators 74 and 76 separated by a birefringent crystal 78, and a birefringent fiber 80.

The controllable polarization rotators 74, 76 may, for example, be provided by conventional liquid crystal polarization rotators and cooperate with the birefringent crystal 78 so that light traversing the assembly will undergo a polarization dependent phase retardation which is a linear function of wavelength. Thus light emerging from the second controllable polarization rotator 76 will have a range of linear and elliptical polarization states. The size of this range is a function of the angle between the polarization direction of the light and the principle axis of the birefringent crystal 78. This angle can be controlled by the first controllable polarization rotator 74. The mean polarization angle of the light emerging from the second polarization rotator 76, relative the principal direction of the birefringent fiber 80 can be controlled by the second polarization rotator 76.

The birefringent fiber 80 can be provided as a conventional birefringent fiber in which the fast axis is oriented in a desired direction. As a result, each of the orthogonal polarization modes of light traversing the birefringent fiber 80 will experience a respective delay, where the differential delay will be a function of the length of the birefringent fiber 80. The proportion of power in each of the orthogonal modes will be a function of the polarization direction of the incident light. As is known in the art, this has the effect of mitigating PMD. Thus, wavelength-dependent PMD mitigation can be controlled by this method.

More complex PMD characteristics may be compensated by cascading a suitable number of linear BCU units 8 of the type illustrated in FIG. 8.

The embodiment(s) of the invention described above is(are) intended to be exemplary only. The scope of the invention is therefore intended to be limited solely by the scope of the appended claims.

We claim:

1. A method of compensating polarization mode dispersion (PMD) in an optical communications system having a broadband PMD compensator adapted to impose a wavelength-dependent differential phase delay of optical signal traffic, the method comprising a step of:

controlling the broadband PMD compensator to independently control a differential group delay at each one of a plurality of selected wavelengths, at least one of the selected wavelengths lying between an adjacent pair of channel wavelengths of the optical communications system.

2. A method as claimed in claim 1, further comprising steps of:
measuring a respective performance parameter value indicative of PMD at each one of a plurality of channel wavelengths of the optical communications system;
calculating estimated performance parameter values at each selected wavelength; and
calculating an error function as a function of wavelength based on the estimated performance parameter values.

3. A method as claimed in claim 2, wherein the measured performance parameter value is indirectly indicative of respective channel PMD of its respective channel of the communications system.

4. A method as claimed in claim 3, wherein the step of measuring performance parameter values comprises, for a selected channel of the optical communications system, a step of measuring one or more of: a respective channel bit error rate and a respective channel signal to noise ratio.

5. A method as claimed in claim 2, wherein the measured performance parameter value is directly indicative of respective channel PMD of the respective channel of the communications system.

6. A method as claimed in claim 5, wherein the step of measuring performance parameter values comprises, for a selected channel of the optical communications system, a step of measuring differential group delay (DGD) of the channel signal.

7. A method as claimed in claim 2, wherein the step of calculating an error function comprises a step of calculating a difference between the estimated performance parameter values and a reference.

8. A method as claimed in claim 7, wherein the predetermined reference comprises either one of: a substantially fixed reference indicative of a desired performance of the optical communications system; and a second set of measured performance parameter values.

9. A method as claimed in claim 2, wherein the step of controlling a broadband PMD compensator comprises steps of:
estimating an optimized value of at least one control setting of the broadband PMD compensator, the estimated optimized control setting value being selected to minimize the error function; and
applying the estimated optimized control setting value to the broadband PMD compensator.

10. A method as claimed in claim 9, wherein the step of estimating an optimized control parameter value comprises an initial step of determining a relationship between a change in the value of each control parameter and a corresponding change in the error function.

11. A method as claimed in claim 9, wherein the broadband PMD compensator is a full vector PMD compensator having an array of control elements adapted to impose an arbitrarily controllable group delay of incident light, each selected wavelength corresponding to a center-wavelength of a respective control element, and wherein the step of estimating an optimized control setting value comprises, for each control element, a step of determining a respective element control setting required to minimize the value of the error function at the respective center wavelength.

12. A system for compensating polarization mode dispersion (PMD) in an optical communications system having a broadband PMD compensator adapted to impose a wavelength-dependent differential phase delay of optical signal traffic, the system comprising:
a controller adapted to control the broadband PMD compensator to independently control a differential group delay at each one of a plurality of selected wavelengths, at least one of the selected wavelengths lying between an adjacent pair of channel wavelengths of the optical communications system.

13. A system as claimed in claim 12, further comprising:
a monitor adapted to measure a respective performance parameter value indicative of PMD at each channel wavelength of the optical communications system; and
a signal processor adapted to:
i) calculate estimated performance parameter values at each selected wavelength; and
ii) calculate an error function as a function of wavelength based on the estimated performance parameter values.

14. A system as claimed in claim 13, wherein the monitor is provisioned to measure the performance parameter at a monitoring point proximal the broadband PMD compensator.

15. A system as claimed in claim 13, wherein the monitor is provisioned to measure the performance parameter at a monitoring point remote from the broadband PMD compensator.

16. A system as claimed in claim 13, wherein at least the monitor is integrated within a performance monitoring system of the optical communications system.

17. A system as claimed in claim 13, wherein the performance parameter is indirectly indicative of respective channel PMD of each channel of the communications system.

18. A system as claimed in claim 17, wherein the performance parameter comprises, for each channel wavelength, one or more of a respective channel bit error rate and a respective channel signal to noise ratio.

19. A system as claimed in claim 13, wherein the performance parameter is directly indicative of respective channel PMD of each channel of the communications system.

20. A system as claimed in claim 19, wherein the performance parameter comprises, for each channel wavelength, differential group delay (DGD) of the channel signal.

21. A system as claimed in claim 13, wherein the error function is indicative of a difference between the estimated performance parameter values and a reference.

22. A system as claimed in claim 21, wherein the reference comprises either one of: a substantially fixed reference indicative of a desired performance of the optical communications system; and a second set of measured performance parameter values.

23. A system as claimed in claim 22, wherein the measured performance parameter is indicative of DGD, and the substantially fixed reference is indicative of a predetermined target DGD, whereby the error function is indicative of a difference between the measured DGD values and the predetermined target DGD value.

24. A system as claimed in claim 21, wherein the controller is provisioned local to the broadband PMD compensator.

25. A system as claimed in claim 21, wherein the controller is provisioned remote from the broadband PMD compensator.

26. A system as claimed in claim 25, wherein the controller is adapted to control a plurality of broadband PMD compensators.

27. A system as claimed in claim 13, wherein the controller is adapted to:
- estimate an optimized value of at least one control setting of the broadband PMD compensator, the estimated optimized value being selected to minimize the error function; and
- apply the estimated optimized control parameter value to the broadband PMD compensator.

28. A system for compensating polarization mode dispersion (PMD) in an optical communications system having a broadband PMD compensator for imposing a wavelength-dependent differential phase delay of optical signal traffic, the system comprising:
- a controller for controlling:
  - i) a first optical element to impose a desired wavelength-dependent rotation of the polarization angle of light traversing the first optical element; and
- a second optical element to retard light traversing the second optical element as a function of polarization angle, the second optical element being connected to receive light from the first optical element.

29. A system as claimed in claim 28, wherein the first optical element comprises:
- a first birefringent element adapted to rotate the polarization direction of light as a function of wavelength and the polarization angle of the light relative to the principle axis of the first birefringent element; and
- a first controllable polarization rotator adapted to control the polarization angle of light incident on the first birefringent element.

30. A system as claimed in claim 29, wherein the first birefringent element comprises a birefringent half-wave plate.

31. A system as claimed in claim 29, wherein the first controllable polarization rotator comprises a liquid crystal rotator adapted to impose a wavelength-independent rotation of the polarization direction of light traversing the liquid crystal rotator, based on a control signal applied to the liquid crystal rotator.

32. A system as claimed in claim 28, wherein the second optical element comprises:
- a second birefringent element adapted to retard light traversing the second birefringent element, the amount of retardation being a function of the polarization angle of the light relative to the principle axis of the second birefringent element; and
- a second controllable polarization rotator adapted to control a mean polarization angle of light incident on the second birefringent element.

33. A system as claimed in claim 32, wherein the second birefringent element comprises a birefringent fiber.

34. A system as claimed in claim 32, wherein the second controllable polarization rotator comprises a liquid crystal rotator adapted to impose a wavelength-independent rotation of the polarization direction of light traversing the liquid crystal rotator, based on a control signal applied to the liquid crystal rotator.

35. An optical device for wavelength-dependent compensation of Polarization Mode Dispersion (PMD) in a wavelength division multiplexed (WDM) communications system, the optical device comprising:
- a first optical element adapted to impose a wavelength-dependent rotation of the polarization angle of light traversing the first optical element; and
- a second optical element adapted to retard light traversing the second optical element as a function of polarization angle, the second optical element being connected to receive light from the first optical element.

36. An optical device as claimed in claim 35, wherein the first optical element comprises:
- a first birefringent element adapted to rotate the polarization direction of light as a function of wavelength and the polarization angle of the light relative to the principle axis of the first birefringent element; and
- a first controllable polarization rotator adapted to control the polarization angle of light incident on the first birefringent element.

37. An optical device as claimed in claim 36, wherein the first birefringent element comprises a birefringent half-wave plate.

38. An optical device as claimed in claim 36, wherein the first controllable polarization rotator comprises a liquid crystal rotator adapted to impose a wavelength-independent rotation of the polarization direction of light traversing the liquid crystal rotator, based on a control signal applied to the liquid crystal rotator.

39. An optical device as claimed in claim 35, wherein the second optical element comprises:
- a second birefringent element adapted to retard light traversing the second birefringent element, the amount of retardation being a function of the polarization angle of the light relative to the principle axis of the second birefringent element; and
- a second controllable polarization rotator adapted to control a mean polarization angle of light incident on the second birefringent element.

40. An optical device as claimed in claim 39, wherein the second birefringent element comprises a birefringent fiber.

41. An optical device as claimed in claim 39, wherein the second controllable polarization rotator comprises a liquid crystal rotator adapted to impose a wavelength-independent rotation of the polarization direction of light traversing the liquid crystal rotator, based on a control signal applied to the liquid crystal rotator.

42. A method of compensating polarization mode dispersion (PMD) in an optical communications system having a broadband PMD compensator for imposing a wavelength-dependent differential phase delay of optical signal traffic, the method comprising steps of:
- controlling a first optical element of the broadband PMD compensator to impose a desired angular separation of light traversing the broadband PMD compensator; and
- controlling a second optical element to retard light traversing the second optical element as a function of polarization angle, the second optical element being connected to receive light from the first optical element.

43. A method as claimed in claim 42, wherein the steps of controlling the first optical element and controlling the mean polarization angle comprises steps of:
- determining a first control setting value for controlling the angular separation of the light traversing the first optical element;
- determining a second control setting value for controlling the desired mean polarization angle of light incident on the second optical element; and
- applying the estimated optimized control setting values to the broadband PMD compensator.

* * * * *